United States Patent [19]
Hopkins et al.

[11] Patent Number: 5,761,818
[45] Date of Patent: Jun. 9, 1998

[54] DIGITAL INCLINOMETER

[75] Inventors: Evan L. Hopkins, 1576 Burlingame Rd., Emporia, Kans. 66801; O. Eugene Dial, Emporia, Kans.

[73] Assignee: Evan L. Hopkins, Emporia, Kans.

[21] Appl. No.: 657,674

[22] Filed: May 31, 1996

[51] Int. Cl.$^6$ .............................. G01C 9/06; G01C 9/34
[52] U.S. Cl. .............................. 33/366; 33/348.2; 33/379
[58] Field of Search .............................. 33/366, 377, 379, 33/381, 348, 348.2; 250/231.1, 573

[56] References Cited

U.S. PATENT DOCUMENTS

| | | | |
|---|---|---|---|
| 3,271,650 | 9/1966 | Riddle | 33/366 |
| 3,863,067 | 1/1975 | Gooley | 33/366 |
| 4,110,609 | 8/1978 | Beer | 33/366 |
| 4,164,077 | 8/1979 | Thomas | 33/348 |
| 4,484,393 | 11/1984 | LaFreniere | 33/366 |
| 4,603,484 | 8/1986 | Strothmann | 33/366 |
| 4,755,801 | 7/1988 | Gooley | 33/379 |
| 4,956,922 | 9/1990 | Bodewes | 33/366 |
| 5,101,570 | 4/1992 | Shimura | 33/379 |
| 5,317,810 | 6/1994 | Isono et al. | 33/366 |

FOREIGN PATENT DOCUMENTS

| | | | |
|---|---|---|---|
| 726809 | 10/1942 | Germany | 33/366 |
| 236986 | 6/1986 | Germany | 33/379 |
| 1-109206 | 4/1989 | Japan | 33/366 |
| 1171662 | 8/1985 | U.S.S.R. | 33/379 |
| WO 93/18370 | 9/1993 | WIPO | 33/366 |

OTHER PUBLICATIONS

U.S. Digital, product brochure—T2 Optical Inclinometer (Tilt Sensor), 4 pages 1996.

Advanced Orientation Systems, Inc., 6 Commerce Drive—Suite 2000, Cranford, NJ 07016–3515; product brochure—Dual Axis Inclination Sensor DX–045D–045 Improved Resolution Version, 1 page, no date.

Advanced Orientation Systems, Inc., 6 Commerce Drive—Suite 2000, Cranford, NJ 07016–3515; product brochure—Dual Axis Inclination Sensor DX–008D–045 Low Profile High Sensitivity Version, 1 page, no date.

Advanced Orientation Systems, Inc., 6 Commerce Drive—Suite 2000, Cranford, NJ 07016–3515; product brochure—EZ–Tilt 1000, 2 pages, Mar. 1996.

Advanced Orientation Systems, Inc., 6 Commerce Drive—Suite 2000, Cranford, NJ 07016–3515; product brochure—EX–Tilt 1000, 7 pages, no date.

The Fredericks Company, 2400 Philmont Avenue, P.O. Box 67, Huntingdon Valley, PA 1906–0067; product brochure—Tilt Sensor, as seen in Machine Design Jul. 27,1 995, copyright 1995 by Penton Publishing, Inc., Cleveland, Ohio 44414—5 pages, 1995.

Applied Geomechanics Incorporated, 1336 Broomer Street, Santa Cruz, CA 95062, product brochure—500—Series Geodetic Tiltmeters, 700—Series Tiltmeters and Tilt-Sensing Systems; 800—Series Engineering Tiltmeters, and 900—Series Biaxial Clinometers, 4 pages, 1995.

Humphrey, a Subsidiary of REMEC, 9212 Balboa Avenue, San Diego, California; product brochure—Measure any Angle Pendulums with Potentiometric Output . . . , 4 pages, no date.

Cline Labs, Inc., 2501 West Behrend Drive—Suite 5, Phoenix, Arizona; product brochure—Angular Measurement System, 4 pages, no date.

Spectron Glass and Electronics, Incorporated, 535 Old Willets Path, Hauppauge, NY 11788; product brochure—Sensors for Measurinng Pitch/Roll/Angle/Level, 14 pages, no date.

Spectron Glass and Electronics, Incorporated, 535 Old Willets Path, Hauppauge, NY 11788; product brochure—Two–Axis Electrolytic Tilt Sensor, 6 pages, no date.

*Primary Examiner*—G. Bradley Bennett
*Attorney, Agent, or Firm*—Hovey,Williams,Timmons & Collins

[57] ABSTRACT

An inclination measuring apparatus including a level for measuring the inclination of an object; an LED for creating an image of the level; and a photodiode array for sensing the image of the level and for generating a level signal representative of the inclination of the apparatus is disclosed.

6 Claims, 1 Drawing Sheet

Microfiche Appendix Included
(1 Microfiche, 36 Pages)

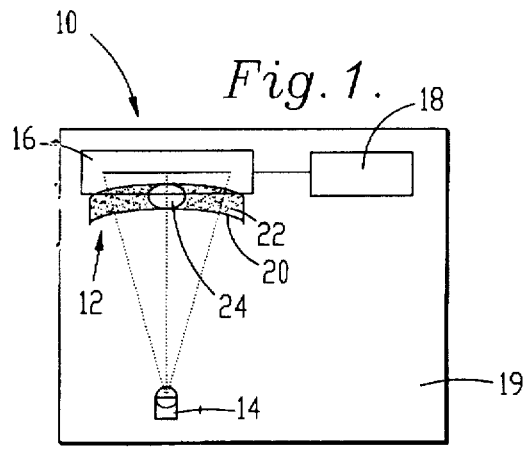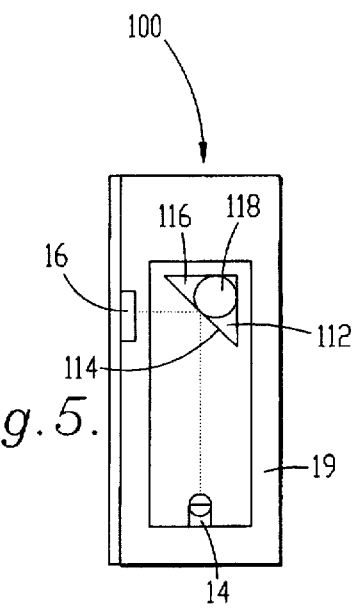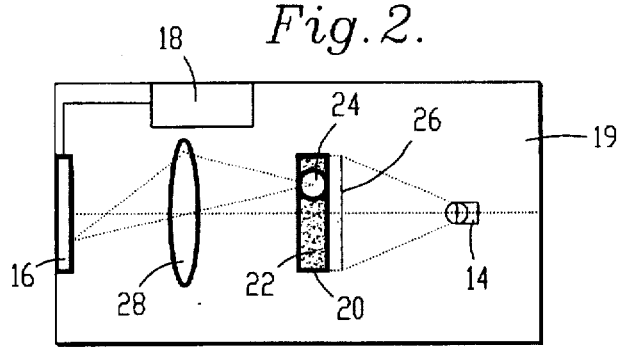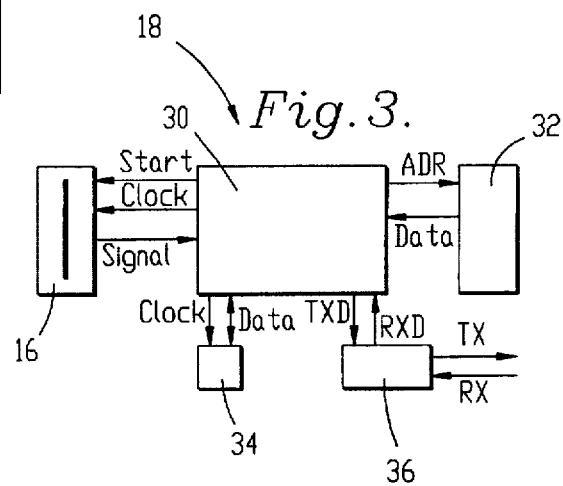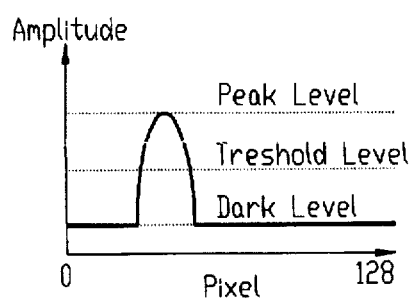

DIGITAL INCLINOMETER

MICROFICHE APPENDIX

A microfiche appendix containing the source code of a computer software useful in accordance with the present invention is appended hereto as 1 sheet of microfiche containing 36 frames.

BACKGROUND OF THE INVENTION

1. Field of the Invention

The present invention relates to inclination measuring devices, and more particularly to a digital inclination measuring device including an imaging means for creating an image of a level vial, sensing means for sensing the position of the imaged bubble within the level vial, and control means for analyzing the signals generated by the sensing means for more accurately determining the exact position of the bubble within the level vial.

2. Description of the Prior Art

It is often desirable to measure the inclination of objects so that the objects can be leveled or so that the object's speed or deceleration can be determined. For example, it is common to measure the inclination of machinery, oil shaft wells, and satellite dish antennas to facilitate leveling of these objects. Additionally, it is common to measure the inclination of aircraft to determine acceleration, heading or other navigational parameters.

Devices for measuring the inclination of objects are known in the art. The most common inclination measuring device is a level vial having a liquid and an air bubble enclosed in a bent tube. The tube is configured so that the bubble floats to the center of the tube when the level vial is placed on a level surface and floats to the sides of the tube when the level vial is placed on inclined surfaces.

Unfortunately, level vials provide only a visual indication of the inclination of an object but cannot accurately measure the degree of inclination of the object. Moreover, level vials do not provide an output signal suitable for numerical display or input to other devices. These limitations prevent level vials from being used in applications where it is necessary to determine the exact inclination of an object or where output signals are desired.

Transits, theodolites, and pendulum levels are also commonly used as inclination measuring devices. Although these devices are generally more accurate than level vials, they are also considerably more expensive, difficult to set up, and contain mechanical parts that are subject to wear. These devices also do not provide an output signal suitable for numerical display or input to other devices.

Electrolytic levels are also used as inclination measuring devices. These devices measure inclination by partially submerging electrodes in an electrolyte liquid. As the electrolytic level is tilted, the amount of contact between the electrodes and the electrolyte liquid increases or decreases, thus changing the conductivity of the electrodes. This change in conductivity is measured and converted to a signal representative of the inclination of the object. Unfortunately, the accuracy of electrolytic levels is sensitive to temperature changes due to expansion and contraction of the electrolyte liquid. Additionally, the sensitivity of these devices can change over time if electrolysis or evaporation reduces the amount of electrolyte in the level.

OBJECTS AND SUMMARY OF THE INVENTION

In view of these limitations of prior are inclination measuring devices, it is an object of the present invention to provide an improved apparatus for measuring the inclination of an object.

It is a more particular object of the present invention to provide an inclination measuring apparatus that is highly accurate and that is not sensitive to temperature changes or fluid loss.

It is another object of the present invention to provide an inclination measuring apparatus that generates a digital output signal representative of the inclination of an object that is suitable for numerical display or input to other devices.

It is another object of the present invention to provide an inclination measuring apparatus that does not include moving mechanical parts that are subject to wear.

It is another object of the present invention to provide an inclination measuring apparatus that is simple and inexpensive to manufacture, setup and use.

In view of these objects and other objects that become evident from the description of the preferred embodiments of the invention herein, an improved inclination measuring apparatus is provided. The inclination measuring apparatus of the present invention broadly includes a level for measuring the inclination of an object; imaging means for creating an image of the level; and sensing means for sensing the image of the level and for generating an image signal representative of the inclination of the object.

The preferred level is a level vial having a liquid and a gas bubble enclosed therein. The level vial is configured so that the bubble floats to the center of the level vial when the level vial is placed on a level surface and floats to the sides of the level vial when the level vial is placed on uneven surfaces. The liquid is preferably opaque and the bubble is preferably translucent.

The preferred imaging means is a light emitting diode for illuminating the level and for creating a shadow image of the level on the sensing means. Light from the LED passes through the translucent bubble and onto the sensing means. Light that contacts the opaque liquid is blocked.

The sensing means is positioned on the side of the level vial opposite the LED for receiving the image of the level vial created by the LED. The preferred sensing means is a photodiode array including a linear array of pixels. The pixels that are positioned behind the translucent bubble receive and sense the light passing through the bubble and therefore produce high amplitude signals. The pixels that are positioned behind the opaque liquid receive little or no light from the LED and therefore produce low or zero amplitude signals.

The preferred inclination measuring apparatus also includes control means for receiving the image signals from the photodiode array and for converting these signals into an array of digital pixel amplitudes. The control means then calculates the exact position of the bubble by calculating the center or peak of the pixel amplitudes. The center or peak of the pixel amplitudes is representative of the position of the bubble and therefore the inclination of the object. The control means may be coupled with other devices responsive to the digital signals such as numerical displays, computers, or automated leveling devices.

By constructing an inclination measuring apparatus as described herein, numerous advantages are realized. For example, by providing an inclination measuring apparatus that images a level vial and then senses the position of the imaged bubble with a photodiode array, the position of the bubble can be determined to the nearest pixel. Thus, the inclination measuring apparatus provides a discrete measurement of the bubble position rather than an approximate visual indication provided by prior art levels.

Additionally, by providing control means that digitizes the analog image signals generated by the photodiode array and that calculates the exact position of the bubble by determining the center of the bubble, the inclination measuring apparatus can detect the bubble position to within a fraction of a pixel. This allows the inclination measuring apparatus of the present invention to measure the inclination of an object more accurately than prior art devices.

Moreover, since the control means determines the inclination of the object by calculating the position of the center of the bubble rather than the position of the entire bubble, changes in the size of the bubble caused by expansion or contraction of the liquid contained in the level vial do not affect the accuracy of the inclination measuring apparatus. Similarly, changes in the size of the bubble caused by leakage or evaporation of the liquid from the level vial do not affect the accuracy of inclination measuring apparatus.

Additionally, since the inclination measuring apparatus of the present invention contains no moving mechanical parts, it is not subject to mechanical wear and therefore does not lose sensitivity over time through use. Moreover, the inclination measuring apparatus is inexpensive and simple to manufacture.

BRIEF DESCRIPTION OF THE DRAWING FIGURES

A preferred embodiment of the present invention is described in detail below with reference to the attached drawing figures, wherein:

FIG. 1 is a schematic view of a digital inclinometer constructed in accordance with a first preferred embodiment of the invention;

FIG. 2 is a schematic view of a digital inclinometer depicting the addition of a focusing lens and a diffuser;

FIG. 3 is a block diagram illustrating the components of the control means of the inclination measuring apparatus;

FIG. 4 is an exemplary plot illustrating the amplitude of various pixels of the photodiode array of the inclination measuring apparatus; and FIG. 5 is a schematic view of a digital inclinometer constructed in accordance with a second preferred embodiment of the invention.

DETAILED DESCRIPTION OF THE PREFERRED EMBODIMENTS

EMBODIMENTS OF FIGS. 1-4

Turning now to FIG. 1, an inclination measuring apparatus 10 constructed in accordance with a preferred embodiment of the invention is illustrated. The inclination measuring apparatus 10 broadly includes a level 12 for measuring the inclination of an object, imaging means 14 for creating an image of the level, sensing means 16 for sensing the image of the level and for generating image signals representative of the image, and control means 18 for converting the image signals received from the sensing means 16 to digital signals representative of the inclination of the object. The level 12, imaging means 14, sensing means 16, and control means 18 are preferably mounted to a single platform 19 such as a circuit board and enclosed within a housing for blocking out ambient light.

In more detail, the preferred level 12 is a conventional level vial including a sealed, bent vial or tube 20 filled with an opaque liquid 22 and a small translucent gas bubble 24. The vial 20 is configured so that the bubble 24 floats to the center of the vial 20 when the level 12 is placed on a level object. Those skilled in the art will appreciate that the radius of bending of the vial 20 determines the distance that the bubble 24 moves when the level 12 is placed on an uneven object. The displacement of the bubble 24 from the center of the vial 20 indicates the degree of rotation of the level 12 from the vertical and therefore measures the inclination of the object on which the level 12 is placed.

The vial 20 is preferably formed of glass, but may also be formed of other suitable materials such as plastic. The liquid 22 contained in the vial 20 can be any opaque liquid, and the bubble 24 is preferably air.

The imaging means 14 is spaced a short distance from one side of the level 12 for creating an image of the level 12 on the sensing means 16. The preferred imaging means 14 is a light emitting diode or other conventional light source that shines light in the direction of the level 12 for illuminating the level 12 and for creating a shadow image of the level 12 on the sensing means 16.

Since the bubble 24 in the level vial 20 is translucent, light emitted from the imaging means 14 passes through the bubble 24 and impinges on the sensing means 16. However, since the liquid 22 in the level vial 20 is opaque, light emitted from the imaging means 14 is blocked by the liquid 22 and is therefore shielded from the sensing means 16.

As illustrated in FIG. 2, the imaging means 14 may be operably coupled with a diffuser 26 and a lens 28. The diffuser 26 is positioned between the imaging means 14 and the level 12, and the lens 28 is positioned between the level 12 and the sensing means 16. The diffuser 26 diffuses the light from the imaging means 14 for fully illuminating the level 12, and the lens 28 images the illuminated level 12 on the sensing means 16. Although the addition of the diffuser 26 and lens 28 increases the complexity and cost of the inclination measuring apparatus 10, this embodiment permits a single inclination measuring apparatus 10 to be used with different sized levels and sensing means.

The sensing means 16 is positioned on the side of the level 12 opposite the imaging means 14 for receiving the image of the level 12. The preferred sensing means 16 is a linear photodiode array having 128 light sensitive pixels arranged in a linear array such as the TSL215 photodiode array manufactured by Texas Instruments.

The light sensitive pixels are positioned relative to the level 12 so that they receive the image of the level 12 formed by the LED. As those skilled in the art will appreciate, each pixel of the photodiode array generates a signal that increases in amplitude as the intensity of light impinging thereon increases.

The pixels that are positioned behind the bubble 24 produce high amplitude signals because the translucent bubble 24 allows light emitted from the imaging means 14 to pass therethrough. However, the pixels that are positioned behind the opaque liquid 22 produce relatively low or zero amplitude signals because the opaque liquid 22 blocks the light emitted from the imaging means 14.

The sensing means 16 may also include other conventional light-sensitive devices such as a charge coupled device (CCD). Additionally, the photodiode array may be an area array rather than a linear array for monitoring a larger section of a conventional curved vial or for monitoring a circular level vial to allow inclination measurement throughout 360 degrees of rotation.

The control means 18 is coupled with the photodiode array 16 for receiving the image or amplitude signals from the pixels. In general, the control means 18 converts the analog image signals to digital signals and calculates the inclination of the object on which the level 12 is placed. As illustrated in FIG. 3, the preferred control means 18 includes a microcontroller 30, an EPROM memory 32, an EEPROM memory 34, and a serial interface device 36.

The operation of the photodiode array is controlled by two 5-volt digital signals depicted as start and clock in FIG. 3. The photodiode array provides an approximate 3-volt analog output image signal at saturation.

The microcontroller 30 includes a digital output port that provides the start and clock signals for controlling the operation of the photodiode array. The microcontroller 30 also includes an internal analog-to-digital converter for digitizing the image or pixel signals received from the photodiode array.

The preferred microcontroller 30 is a Model No. 80C552 processor manufactured by Phillips. However, other conventional microcontrollers, microprocessors or computers may also be used with the present invention without departing from the scope of the invention.

The EPROM memory 32 stores the software instructions for controlling the operation of the micro controller 30. The software instructions are reproduced in the attached Microfiche Appendix and are discussed in more detail below. The micro controller 30 communicates with the EPROM memory 32 over an ADR bus and Data bus depicted in FIG. 3.

The preferred EPROM memory 32 is a Model No. SGS 27C512 with a Phillips 74HC573 address latch. The micro controller 30 may also store the software internally in the mask-software PROM, OTP, or EPROM memory rather than on EPROM memory 32.

The EEPROM memory 34 stores calibration data and communicates with the microcontroller 30 over a Clock and Data bus. The preferred EEPROM memory 34 is a Model No. 24CO4 memory device manufactured by Excel. Those skilled in the art will appreciate that the calibration data stored in the EEPROM memory 34 could also be stored elsewhere such as in the EPROM memory 32.

The serial interface 36 receives 5-volt serial communication signals TXD and RXD from the micro controller 30 and converts these signals to 12-volt RS232 signals. This allows the inclination measuring apparatus 10 to be coupled with external devices such as a 7-segment or LCD display for indicating the measured inclination or other computers or processors for controlling external devices.

SOFTWARE

The software stored in the EPROM memory 32 for operating the micro controller 30 continuously cycles the microcontroller 30 between the steps of: (1) photodiode array readout; (2) threshold determination; (3) bubble position calculation; (4) calibration; and (5) output. Each of these steps are discussed separately below.

Photodiode Array Readout

The microcontroller 30 allows the photodiode array 16 to accumulate light for a fixed interval of time, called the exposure time. The microcontroller 30 then clocks the pixel signals out of the photodiode array by sending the start and clock signals to the photodiode array.

It may be necessary to read or clock out the photodiode array signals several times with a given exposure time before its value stabilizes. Therefore, it is important for the software to maintain a steady readout of the photodiode array.

The exposure time should be short enough so that the pixel amplitudes do not saturate, but long enough so that the pixel amplitudes are a significant fraction of their available full-scale range. The software can increase or decrease the exposure time in accordance with the available full-scale range to keep the maximum pixel amplitude at a desirable level.

The microcontroller's 30 analog-to-digital converter then digitizes the amplitude signals generated by each pixel, resulting in an array of pixel signals $A_i$, where A equals the amplitude of a pixel and $i$ equals 1–128 for a 128 pixel photodiode array.

FIG. 4 shows a representative plot of the amplitude vs. pixel number for a 128 pixel photodiode array. As discussed above, pixels near the center of the bubble 24 have increased amplitude due to the light passing through the bubble 24. Other pixels are at a low or dark level due to the opaque liquid 22 which blocks the light emitted from the imaging means 14.

As illustrated in FIG. 4, the amplitude of the pixels near the edges of the bubble 24 do not drop in a step fashion, but rather drop off gradually. Fortunately, the gradual dropoff of the signals contributes to the accuracy of the center pixel calculation described below.

Threshold Determination

To distinguish the position of the bubble 24 from the surrounding opaque fluid 22, the software performs a threshold operation to separate the pixels with high amplitudes from the pixels with low amplitudes. Applicants have discovered that a threshold amplitude value that is midway between the minimum, dark amplitude and the maximum, bright amplitude is best. However, other threshold values may also be selected.

To perform the threshold determination, the software first calculates the threshold number that is one-half the way between the darkest pixel and the brightest pixel. The software then disregards all pixel values from the pixel array that are below this threshold number.

Bubble Position Calculation

To determine the position of the bubble 24 relative to the level 12, the software calculates the center or the peak of the amplitude signals. The center or centroid pixel is preferably calculated with the following equation:

$$\text{CenterPixel} = \frac{\Sigma \, i(A_i - T)}{\Sigma \, (A_i - T)}$$

where the indicated summations only include pixels, I, such that the amplitude $A_i$ exceeds the threshold, T, i.e., $A_i \geq T$. The calculation is set forth in the following pseudo-code representation:

```
SumIA = O
SumA = O
For I = FirstPixelNumber to LastPixelNumber
    If (Amplitude[I] > Threshold)
        Difference = Amplitude[I] - Threshold
        SumIA = SumIA + I * Difference
        SumA = SumA + Difference
    EndIf
Next I
CenterPixel = SumIA/SumA
```

Although the above centroid equation is the preferred method for calculating the bubble 24 position, those skilled in the art will appreciate that other methods may be employed. For example, the bubble 24 position may be calculated by locating the left and right edges of the bubble 24 and then interpolating these edges to find the center position.

An important advantage of the present invention is that even if the bubble 24 becomes larger due to fluid loss from the level vial 20, the center or peak of the pixel signal will remain in the same position. Therefore, the calculated center pixel number from the above equation is independent of bubble size, and the inclination measuring apparatus 10 of the present invention does not become less accurate as fluid is lost from the level vial 20.

Another advantage of the present invention is that the centroid calculation allows the microprocessor to interpolate the center position of the bubble 24 to subpixel level. This is achieved because the pixel signals rise gradually from a dark level to a peak and back down again as illustrated in FIG. 4. This allows the microcontroller 30 to calculate the exact peak or center of the signals to within a fraction of a pixel.

To achieve such sub-pixel accuracy, the pixel signals of the bubble 24 image must rise and fall gradually as illustrated in FIG. 4. Therefore, it may be necessary to slightly blur the optical system by defocusing the lens 28 or by altering the distance between the level 12 and the photodiode array to blur the image of the bubble 24.

Calibration

To calibrate the inclination measuring apparatus 10, it should be placed on a surface of known inclination, and the centroid pixel should then be calculated as described above. This data can be used to determine a calibration curve.

For example, one linear calibration is given by $$\text{Inclination} = \frac{(\text{CenterPixel} - \text{ZeroPixel})}{\text{PixelSize}}$$

where

Inclination=inclination angle in degrees,

ZeroPixel=center pixel number when the inclinometer is on a level surface,

PixelSize=degrees per pixel.

If the relationship between pixel number and inclination angle is not linear to the desired degree of accuracy, then it will be necessary to use a higher order polynomial, calibration table, or other calibration function to relate pixel number to inclination angle. Those familiar with the art of curve fitting can readily implement these or other calibration procedures without departing from the scope of the invention.

Output

The final step performed by the micro controller 30 is to output the RS232 signals generated by the serial interface 36 to other external devices. Those skilled in the art will appreciate that any external device such as a 7-segment LED or LCD display or a computer may be coupled with the serial interface 36.

Embodiment of FIG. 5

FIG. 5 illustrates a second preferred embodiment of an inclination measuring apparatus 100. In this embodiment, the conventional level is replaced with a reflective-type level vial 112. The preferred reflective-type vial 112 is described in U.S. Pat. No. 4,164,077, hereby incorporated by reference.

In general, the reflective-type level vial 112 has a liquid channel presenting an angled surface 114. The channel is filled with a liquid 116 and a small air bubble 118. When light strikes the angled surface 114, total internal reflection occurs if the light passes from a region of high index of refraction to a region of low index of refraction.

Light striking the angled surface 114 where the bubble 118 is present reflects away from the channel as depicted by the dashed lines in FIG. 5. However, light striking the angled surface 114 where the liquid 116 is present passes out on the top of the reflective vial 112.

The inclination measuring apparatus 100 includes a control means similar or identical to the control means 18 described in the first embodiment of the invention.

Additionally, the inclination measuring apparatus 100 may include a lens and diffuser similar to those described in the first embodiment of the invention.

The inclination measuring apparatuses 10,100 of the present invention can be used in any application where inclination measurements are desired. Exemplary applications include measuring the level of machine tools, vehicle headlamps, and vehicles such as campers, recreational vehicles, and trailers. Other applications include sensing the acceleration of a vehicle, controlling the deployment of an airbag in a vehicle, sensing the deacceleration of a towing vehicle to control the brakes of a towed vehicle, and measuring the bank or roll of an aircraft.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An inclination measuring apparatus for measuring the inclination of an object, the apparatus comprising:

a reflective-type level including an enclosed channel presenting a lower angled surface, the channel having a liquid and a small bubble enclosed therein;

imaging means for directing light in a path towards the angled surface within the enclosed channel, the angled surface, liquid, and bubble cooperating for reflecting at least a portion of the light away from the level when the bubble is in the path of the light but for allowing the light to pass directly through the level when the bubble is not in the path of the light; and a sensor positioned to detect the light that is reflected away from the level for determining the position of the bubble.

2. The apparatus as set forth in claim 1, the sensor including a linear photodiode array.

3. The apparatus as set forth in claim 1, the sensor including an area photodiode array.

4. The apparatus as set forth in claim 1, the sensor including a charge coupled device.

5. The apparatus as set forth in claim 1, the enclosed channel of the reflective-type level being an elongated, curved tube.

6. The apparatus as set forth in claim 1, the enclosed channel of the reflective-type level being a circular tube.

* * * * *